(12) United States Patent
Iwata et al.

(10) Patent No.: US 7,245,050 B2
(45) Date of Patent: Jul. 17, 2007

(54) INTERNAL COMBUSTION ENGINE

(75) Inventors: Kazuyuki Iwata, Wako (JP); Takehiko Sayama, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/222,980

(22) Filed: Aug. 19, 2002

(65) Prior Publication Data

US 2003/0051679 A1    Mar. 20, 2003

(30) Foreign Application Priority Data

| Aug. 20, 2001 | (JP) | ............................. 2001-248708 |
| Aug. 20, 2001 | (JP) | ............................. 2001-248709 |
| Aug. 20, 2001 | (JP) | ............................. 2001-248710 |

(51) Int. Cl.
*H02K 9/00* (2006.01)

(52) U.S. Cl. ............................ 310/58; 310/52; 310/59

(58) Field of Classification Search ............ 310/52–65; 123/149 R, 196 R
See application file for complete search history.

(56) References Cited

U.S. PATENT DOCUMENTS

| 1,082,261 | A | * | 12/1913 | Bright ................... 123/179.14 |
| 2,998,471 | A | * | 8/1961 | Jaulmes .................. 123/149 R |
| 3,665,811 | A | * | 5/1972 | Van Avermaete ............ 91/492 |
| 3,747,649 | A | * | 7/1973 | Densow et al. ............... 30/381 |
| 4,709,669 | A | * | 12/1987 | Wissmann et al. ....... 123/149 D |
| 4,791,892 | A | * | 12/1988 | Hall ......................... 123/47 R |
| 5,287,518 | A | * | 2/1994 | Miller et al. .................. 322/90 |
| 5,372,213 | A | * | 12/1994 | Hasebe et al. ............. 180/65.6 |
| 5,509,381 | A | * | 4/1996 | Fisher ..................... 123/41.31 |
| 5,568,842 | A | * | 10/1996 | Otani ........................ 184/6.22 |
| 5,605,045 | A | * | 2/1997 | Halimi et al. ................. 60/607 |
| 5,619,956 | A | * | 4/1997 | Koziara et al. .......... 123/41.31 |

(Continued)

FOREIGN PATENT DOCUMENTS

DE          7012107        11/1970

(Continued)

OTHER PUBLICATIONS

German Office Action dated Sep. 8, 2004 (3 pages).

(Continued)

*Primary Examiner*—Thanh Lam
(74) *Attorney, Agent, or Firm*—Armstrong, Kratz, Quintos, Hanson & Brooks, LLP

(57) ABSTRACT

A journal of a crankshaft is rotatably supported by a journal-supporting portion of a cylinder block and a bearing cap. An arcuate oil guide groove is defined in a side face of the bearing cap, and coils which are portions of a stator of a generator or motor are fitted into an oil guide groove. Oil flowing down from an oil return passage provided in the cylinder block and oil flowing down from a blow-by gas passage, flow downwards from an upper end of the oil guide groove and return through an opening to an oil pan. In this process, the oil is brought into contact with the coils to cool the stator. Therefore, even if the stator is located above the oil stored in the oil pan, the stator having a raised temperature can be cooled efficiently, to thereby prevent degradation of the performance of the generator or motor.

14 Claims, 9 Drawing Sheets

U.S. PATENT DOCUMENTS 6,355,996 B1 * 3/2002 Birkestrand .................. 310/54
6,626,138 B2 * 9/2003 Sayama et al. ......... 123/149 R

FOREIGN PATENT DOCUMENTS

| | | |
|---|---|---|
| DE | 41 12 215 C1 | 9/1992 |
| DE | 199 50 836 A1 | 5/2001 |
| EP | 0 302 118 A1 | 2/1989 |
| JP | 59092743 A * | 5/1984 |
| JP | 9-182371 | 7/1997 |
| JP | 09182371 A * | 7/1997 |
| JP | 09308145 A * | 11/1997 |

OTHER PUBLICATIONS

Patent Abstracts of Japan, Publication No. 60162435 A, Aug. 24, 1985, 1 page.

* cited by examiner

INTERNAL COMBUSTION ENGINE

BACKGROUND OF THE INVENTION

1. Field of the Invention

The present invention relates to an internal combustion engine including a generator or motor, whose stator comprised of a core and coils mounted to the core is opposed to permanent magnets mounted at a moving portion of the internal combustion engine.

2. Description of the Related Art

An internal combustion engine including a generator or motor is conventionally known from Japanese Patent Application Laid-open No.9-182371. The generator or motor is comprised of permanent magnets mounted at a moving portion of the internal combustion engine, and coils mounted so that they are opposed to the permanent magnets. Thus, the generator or motor can function as the generator by supplying electric current to the coils to assist the power output from the internal combustion engine, and the generator or motor can function as the motor to generate an electric power by rotating a crankshaft by an output or an external force from the internal combustion engine.

The internal combustion engine disclosed in Japanese Patent Application Laid-open No. 9-182371 has no means for cooling the stator. Therefore, when the generator or motor functions, the coils generate heat to raise the temperature of the stator, which may affect the function and durability of the generator or motor, and thus it is necessary to cool the stator by any means.

SUMMARY OF THE INVENTION

Accordingly, it is an object of the present invention to effectively cool the stator of the generator or motor mounted within the internal combustion engine.

To achieve the above object, according to a first feature of the present invention, there is provided an internal combustion engine including a generator or motor whose stator comprised of a core and coils mounted to the core is opposed to permanent magnets mounted at a moving portion of the internal combustion engine, wherein the internal combustion engine further includes a stator-cooling means for cooling the stator by oil.

With the above arrangement, the stator-cooling means for cooling the stator of the generator or motor by the oil cools the stator having the temperature raised by the heat generated by the coils by cooperation with the permanent magnets, whereby the function of the generator or motor can be exhibited reliably.

According to a second feature of the present invention, in addition to the arrangement of the first feature, the stator-cooling means cools the stator by the oil which has lubricated portions to be lubricated and is returning to an oil pan.

With the above arrangement, the stator-cooling means cools the stator by the oil which has lubricated the portions to be lubricated and is returning to the oil pan, thereby efficiently utilizing the oil which has accomplished the lubricating function to cool the stator.

According to a third feature of the present invention, in addition to the arrangement of the first feature, the stator-cooling means cools the stator by the oil from a passage for returning the oil within a cylinder head to an oil pan.

With the above arrangement, the stator is cooled by the oil from the passage for returning the oil within the cylinder head to the oil pan, thereby efficiently utilizing a sufficient amount of the oil which has finished the lubrication of a valve-operating mechanism and the like within the cylinder head, to effectively cool the stator.

According to a fourth feature of the present invention, there is provided an internal combustion engine including a generator or motor whose stator comprised of a core and coils mounted to the core is opposed to permanent magnets mounted at a moving portion of the internal combustion engine, wherein a cooling oil is supplied to an upper portion of the stator.

With the above arrangement, the cooling oil is supplied to the upper portion of the stator to cool the stator of the generator or motor, so that the stator having the temperature raised by the heat generated by the coils by cooperation with the permanent magnets can be cooled effectively by the oil flowing from the upper portion to a lower portion of the stator, whereby the function of the generator or motor can be reliably exhibited.

According to a fifth feature of the present invention, in addition to the arrangement of the fourth feature, at least a portion of the stator is accommodated in an oil guide groove defined in a side face of a stator-supporting member, and the cooling oil is supplied to an upper potion of the oil guide groove.

With the above arrangement, at least a portion of the stator is accommodated in the oil guide groove defined in the side face of the stator-supporting member. Therefore, the stator can be cooled effectively by the cooling oil supplied to the upper portion of the oil guide groove and flowing downwards along the oil guide groove, and moreover the generator or motor can be disposed compactly.

According to a sixth feature of the present invention, in addition to the arrangement of the first or fourth feature, the stator having the coils wound around the core formed by laminated steel plates is fixed to a bearing cap which rotatably supports a crankshaft by cooperation with a cylinder block; the generator or motor whose rotor having a plurality of permanent magnets fixed to an outer periphery of a web of the crankshaft is opposed to an inner periphery of the stator, is disposed in an upper space in an oil pan dispose below the cylinder block; and the core of the stator is provided with a heat-dissipating fin.

With the above arrangement, the core of the stator constituting the generator or motor by cooperation with the rotor mounted on the crankshaft is provided with the heat-dissipating fin. Therefore, when the coils generate the heat as a result of the operation of the generator or motor, the heat of the coils can be dissipated from the heat-dissipating fin provided on the core, thereby effectively cooling the stator to ensure that the generator or motor can reliably function.

According to a seventh feature of the present invention, in addition to the arrangement of the sixth feature, the heat-dissipating fin provided on the core of the stator constitutes a baffle plate for the oil pan.

With the above arrangement, the heat-dissipating fin constitutes the baffle plate for the oil pan, so that, without provision of a special baffle plate, the heat-dissipating fin can be also used as the baffle plate for the oil pan to prevent the shaking of the oil stored in the oil pan.

According to an eighth feature of the present invention, in addition to the arrangement of the sixth feature, the heat-dissipating fin is formed by extending some of the steel plates constituting the core of the stator.

With the above arrangement, the heat-dissipating fin is formed by extending some of the steel plates constituting the core of the stator, and, hence, a special member constituting the heat-dissipating fin is not required, thereby reducing the number of parts and the number of assembling steps.

According to a ninth feature of the present invention, in addition to the arrangement of the sixth feature, the heat-dissipating fin is formed by superposing a plurality of the steel plates on one another.

With the above arrangement, the heat-dissipating fin is formed by superposing the plurality of the steel plates on one another, and, hence, the rigidity of the heat-dissipating fin can be sufficiently enhanced.

According to a tenth feature of the present invention, in addition to the arrangement of the first or fourth feature, the generator or motor comprises a plurality of coils mounted on a bearing cap rotatably supporting the crankshaft by cooperation with a cylinder block, and a plurality of permanent magnets mounted on the crankshaft; at least one balance weight and at least one disk are mounted at ends of a plurality of journals of the crankshaft; and the permanent magnets are mounted on an outer peripheral portion of the disk, so that they are opposed to the coils for movement relative to the coils.

With the above arrangement, the balance weight and the disk are mounted at the ends of the plurality of journals of the crankshaft, and the plurality of permanent magnets mounted on the outer peripheral portion of the disk are relatively movably opposed to the plurality of coils mounted on the bearing cap. Therefore, the number of opposed areas between the permanent magnets and the coils can be increased. When the generator or motor functions as a generator, an output torque can be efficiently generated. When the generator or motor functions as a motor, an electric power can be efficiently generated.

According to an eleventh feature of the present invention, in addition to the arrangement of the tenth feature, the permanent magnets are mounted on the entire outer peripheral portion of said at least one disk.

With the above arrangement, the number of the opposed areas between the permanent magnets and the coils can be maximized, and the performance of the generator or motor can be further enhanced.

According to a twelfth feature of the present invention, in addition to the arrangement of the tenth feature, the crankshaft includes first to fifth journals; a total of four balance weights are mounted at one end of the first journal, one end of the fifth journal and opposite ends of the third journal; and the disk is mounted on at least one of opposite ends of the second journal and opposite ends of the fourth journal.

With the above arrangement, among the first to fifth journals supporting the crankshaft, the total of four balance weights are mounted at the one end of the first journal, the one end of the fifth journal and the opposite ends of the third journal, and the disk is mounted on at least one of the opposite ends of the second journal and the opposite ends of the fourth journal. Therefore, while the balance weights are disposed appropriately on the crankshaft to ensure a vibration-preventing effect, a load of the generator or motor can be prevented from acting on the third journal on which a largest combustion load acts, thereby reducing the weight of the crankshaft.

According to a thirteenth feature of the present invention, in addition to the arrangement of the twelfth feature, the four disks in total are mounted at the opposite ends of the second journal and the opposite ends of the fourth journal.

With the above arrangement, the total of four disks are mounted at the opposite ends of the second journal and the opposite ends of the fourth journal, and, hence, the number of the generators or motors can be maximized, while preventing the load of the generator or motor from acting on the third journal.

According to a fourteenth feature of the present invention, in addition to the arrangement of the tenth feature, a balancer device is mounted below axially one end of the crankshaft, and the generator or motor is mounted at the axially other end of the crankshaft in a manner such that it does not interfere with the balancer device.

With the above arrangement, the balancer device and the generator or motor are mounted below the axially one end and the axially other end of the crankshaft, respectively. Therefore, the balancer device and the generator or motor can be disposed compactly in such a manner that they do not interfere with each other.

A generator motor GM in each of embodiments corresponds to the generator or motor of the present invention; a bearing cap 14d in each of the embodiments corresponds to the stator-supporting member of the present invention; an oil return passage 53 and a blow-by gas passage 54 in each of the embodiments corresponds to the passage of the present invention; and a disk 21 in each of the embodiments corresponds to the web of the present invention.

The above and other objects, features and advantages of the invention will become apparent from the following description of the preferred embodiment taken in conjunction with the accompanying drawings.

BRIEF DESCRIPTION OF THE DRAWINGS

FIGS. 1 to 5 show a first embodiment of the present invention, wherein

FIG. 1 is a vertical sectional view of an internal combustion engine;

FIG. 2 is a sectional view taken along a line 2-2 in FIG. 1;

FIG. 3 is an enlarged view of essential portions of FIG. 1;

FIG. 4 is a sectional view taken along a line 4-4 in FIG. 1; and

FIG. 5 is a sectional view taken along a line 5-5 in FIG. 4.

FIGS. 6 to 8 show a second embodiment of the present invention, wherein

FIG. 6 is a vertical sectional view of an internal combustion engine;

FIG. 7 is a sectional view taken along a line 7-7 in FIG. 6; and

FIG. 8 is an enlarged view of essential portions of FIG. 6.

DESCRIPTION OF THE PREFERRED EMBODIMENTS

Figure 1:
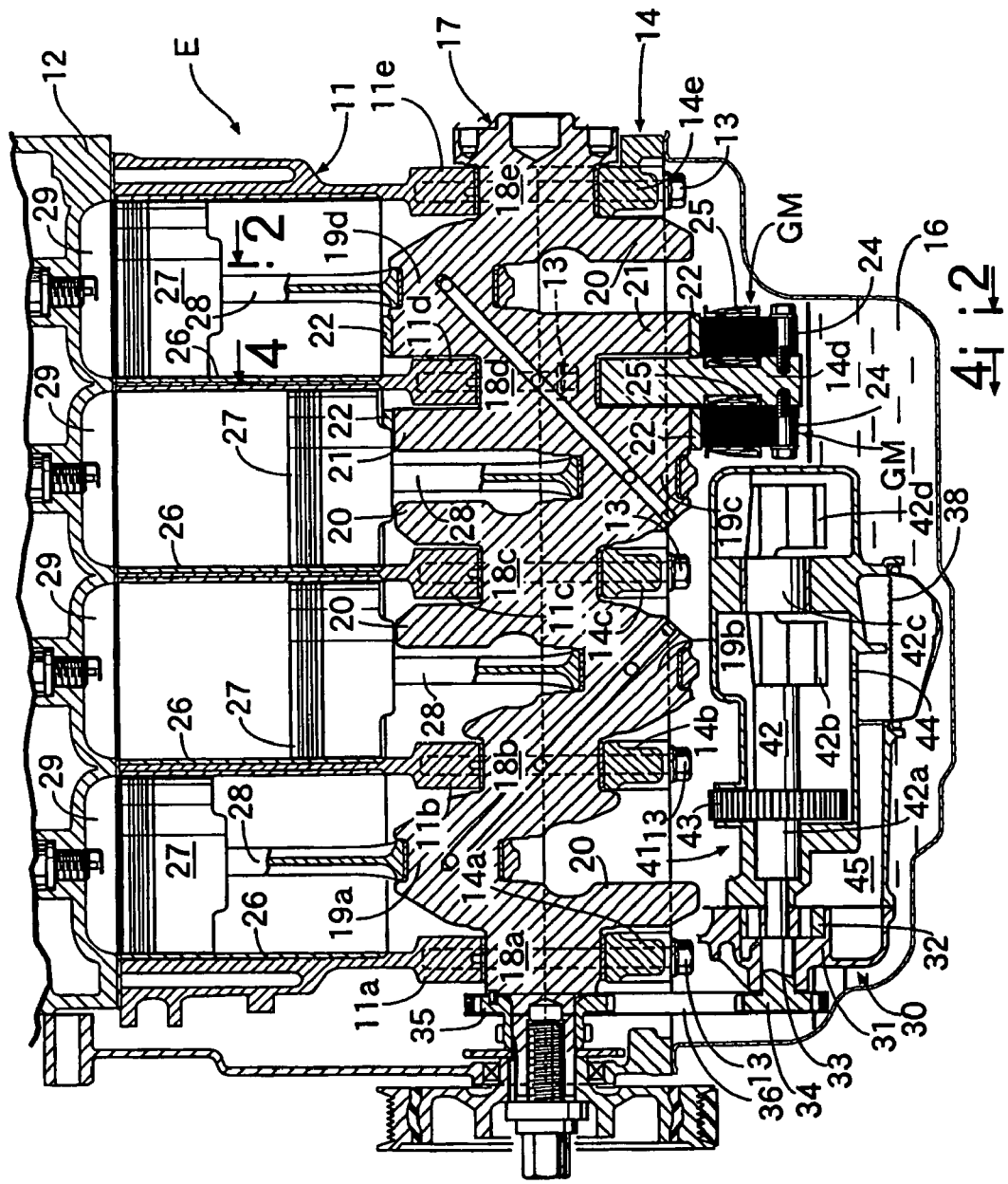
Figure 2:
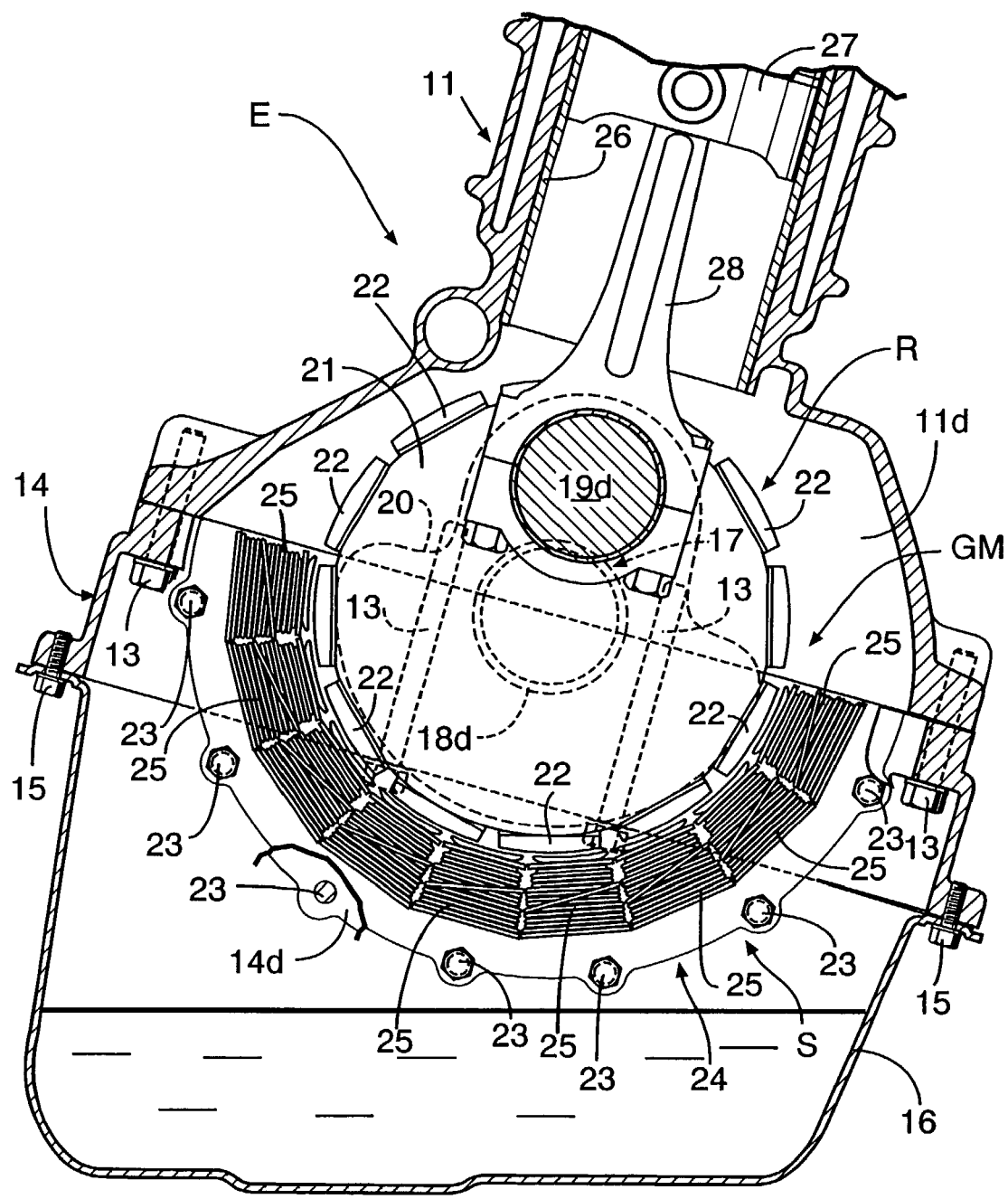

A first embodiment of the present invention will now be described with reference to FIGS. 1 to 5.

An in-line 4-cylinder internal combustion engine E of this embodiment is mounted in a hybrid vehicle, and includes two generator motors GM, GM therein, each of which functions as a generator/motor. The internal combustion engine E includes a cylinder block 11, a cylinder head 12 coupled to an upper surface of the cylinder block 11 by bolts (not shown), a crankcase 14 coupled to a lower surface of the cylinder block 11 by bolts 13, and an oil pan 16 coupled to a lower surface of the crankcase 14 by bolts 15.

A crankshaft 17 includes five journals 18a, 18b, 18c, 18d and 18e, and four crankpins 19a, 19b, 19c and 19d located between the journals 18a to 18e, and a total of four balance weights 20 are integrally provided at an axially inner end of the first journal 18a, an axially inner end of the fifth journal 18e and axially opposite ends of the third journal 18c. The four balance weights 20 are formed into a fan shape around the first journal 18a, the third journal 18c and the fifth journal 18e serving as pivots (see FIG. 2). Two disks 21 are integrally provided at axially opposite ends of the fourth journal 18d. A plurality of (e.g., 12) permanent magnets 22 are mounted around an outer periphery of each of the two disks 21. The disk 21 and the permanent magnets 22 around the disk 21 constitute a rotor R of a generator motor GM.

Five journal-supporting portions 11a, 11b, 11c, 11d and 11e are integrally formed on the cylinder block 11. The five journals 18a to 18e of the crankshaft 17 are rotatably carried between five bearing caps 14a, 14b, 14c, 14d and 14e integrally formed on the crankcase 14 and the five journal-supporting portions 11a to 11e, respectively. The bearing cap 14d supporting the fourth journal 18d is larger than the other four bearing caps 14a, 14b, 14c and 14e, and is formed into a semi-circular shape.

Stators S, S of the two generator motors GM, GM are mounted on opposite side faces of the bearing cap 14d having the semi-circular shape. The stator S of the generator motor GM comprises a substantially arcuate core 24 which is comprised of a large number of steel plates superposed one on another and which is fixed to the bearing cap 14d by bolts 23, and a plurality of (e.g., nine) coils 25 wound around an inner periphery of the core 24. Outer peripheries of the plurality of permanent magnets 22 of the rotor R are opposed to inner peripheries of the plurality of coils 25 with small gaps left therebetween.

Arcuate oil guide grooves 51 (see FIGS. 4 and 5) are defined on opposite side faces of the bearing cap 14d, respectively, and one-side faces of the coils 25 of the stator S are fitted into each of the oil guide groove 51. An opening 52 is made at a lower end of the oil guide groove 51 so that the oil guide groove 51 communicates with an upper space in the oil pan 16 through the opening 52. An oil return passage 53 is defined vertically through one of side faces of the cylinder block 11 so that its upper end communicates with a valve-operating chamber defined within the cylinder head 12, and its lower end communicates with upper portions of the pair of oil guide grooves 51, 51 on the upper face of the bearing cap 14d. A blow-by gas passage 54 is defined vertically through the other side face of the cylinder block 11, so that its upper end communicates with the valve-operating chamber defined within the cylinder head 12, and its lower end communicates with upper portions of the pair of oil guide grooves 51, 51 on the upper face of the bearing cap 14d.

Pistons 27 are slidably received in four cylinder bores 26 defined in the cylinder block 11, respectively, and the four pistons 27 and the four crankpins 19a to 19d are interconnected by connecting rods 28, respectively. Combustion chambers 29 are defined in the lower surface of the cylinder head 12, and face top faces of the pistons 27, respectively.

An oil pump 30 accommodated in the oil pan 16 includes a pump housing 31, a pump rotor 32 accommodated in the pump housing 31, and a pump shaft 33 on which the pump rotor is rotatably supported. A follower sprocket 34 mounted at an end of the pump shaft 33 protruding from the pump housing 31 is connected through an endless chain 36 to a drive sprocket 35 mounted at an end of the crankshaft 17. Therefore, the rotation of the crankshaft 17 is transmitted through the drive sprocket 35, the endless chain 36 and the follower sprocket 34, to the pump shaft 33 to rotate the pump rotor 32 integral with the pump shaft 33. As a result, oil stored in the oil pan 16 is drawn through the inside of a strainer 38 into the oil pump 30 and supplied therefrom to portions to be lubricated in the internal combustion engine E, e.g., the journals 18a to 18e of the crankshaft 17 and the valve-operating chamber in the cylinder head 12.

An oil passage 39 is defined in the cylinder block 11 in parallel with the crankshaft 17 and diverted into a plurality of oil passages 40 to communicate with outer peripheral portions of the journals 18a to 18e of the crankshaft 17, in order to lubricate slide surfaces of the journal-supporting portions 11a to 11e as well as the bearing caps 14a to 14e and the journals 18a to 18e.

A balancer device 41 includes a first balancer shaft 42 in which the pump shaft 33 of the oil pump 30 extends integrally and axially with the pump shaft 33. The first balancer shaft 42 is integrally provided with a first journal 42a, an interlocking gear 43, a first balance weight 42b, a second journal 42c and a second balance weight 42d in the named order from the side of the oil pump 30. The first journal 42a and the second journal 42c are rotatably supported in a balancer housing 44 which covers the pump rotor 32 and the balancer shaft 42 by cooperation with the pump housing 31. An oil supply passage 45 for guiding the oil drawn into the strainer 38 to the oil pump 30 is provided in a lower portion of the balancer housing 44.

Figure 3:
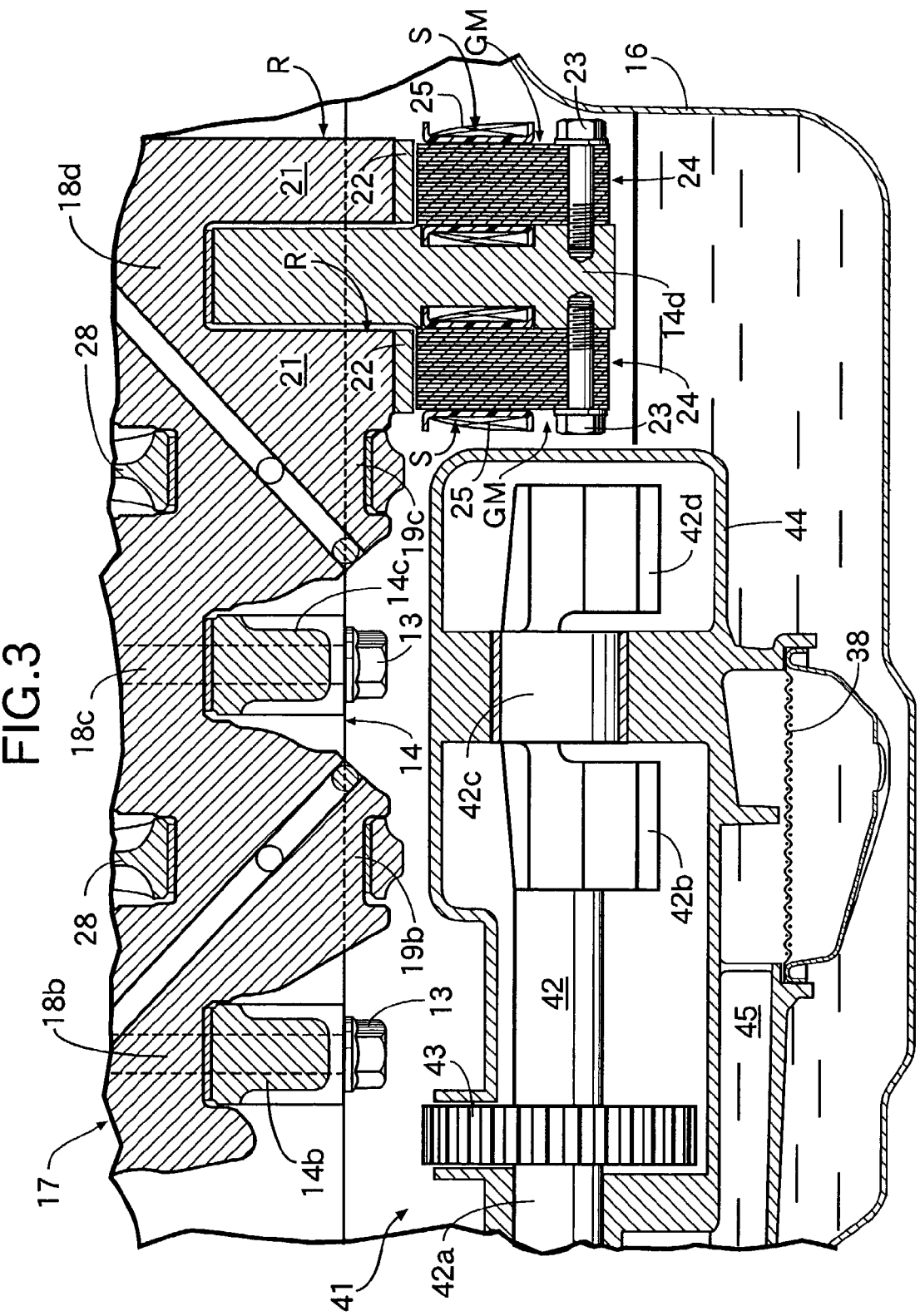
Figure 4:
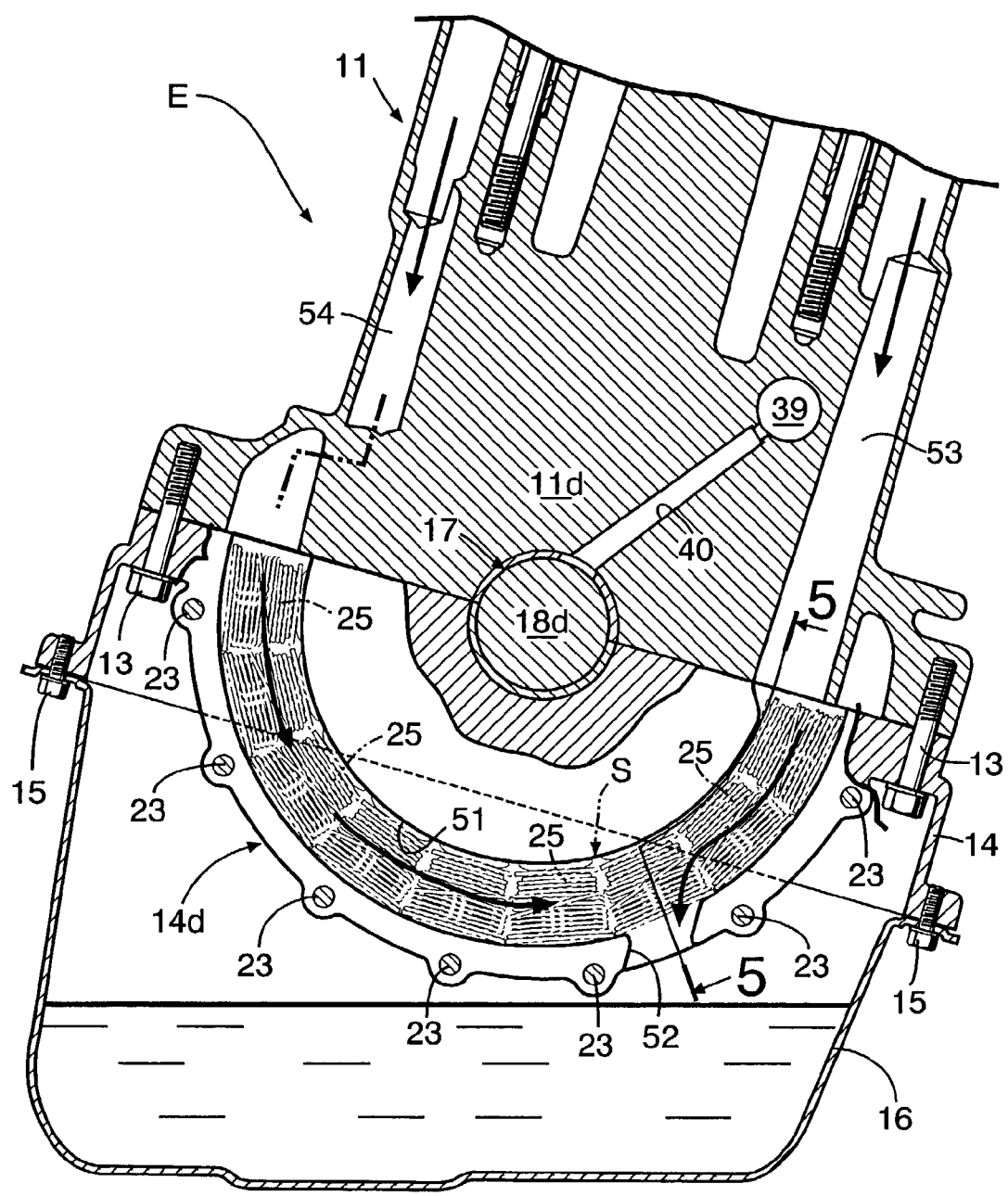
Figure 5:
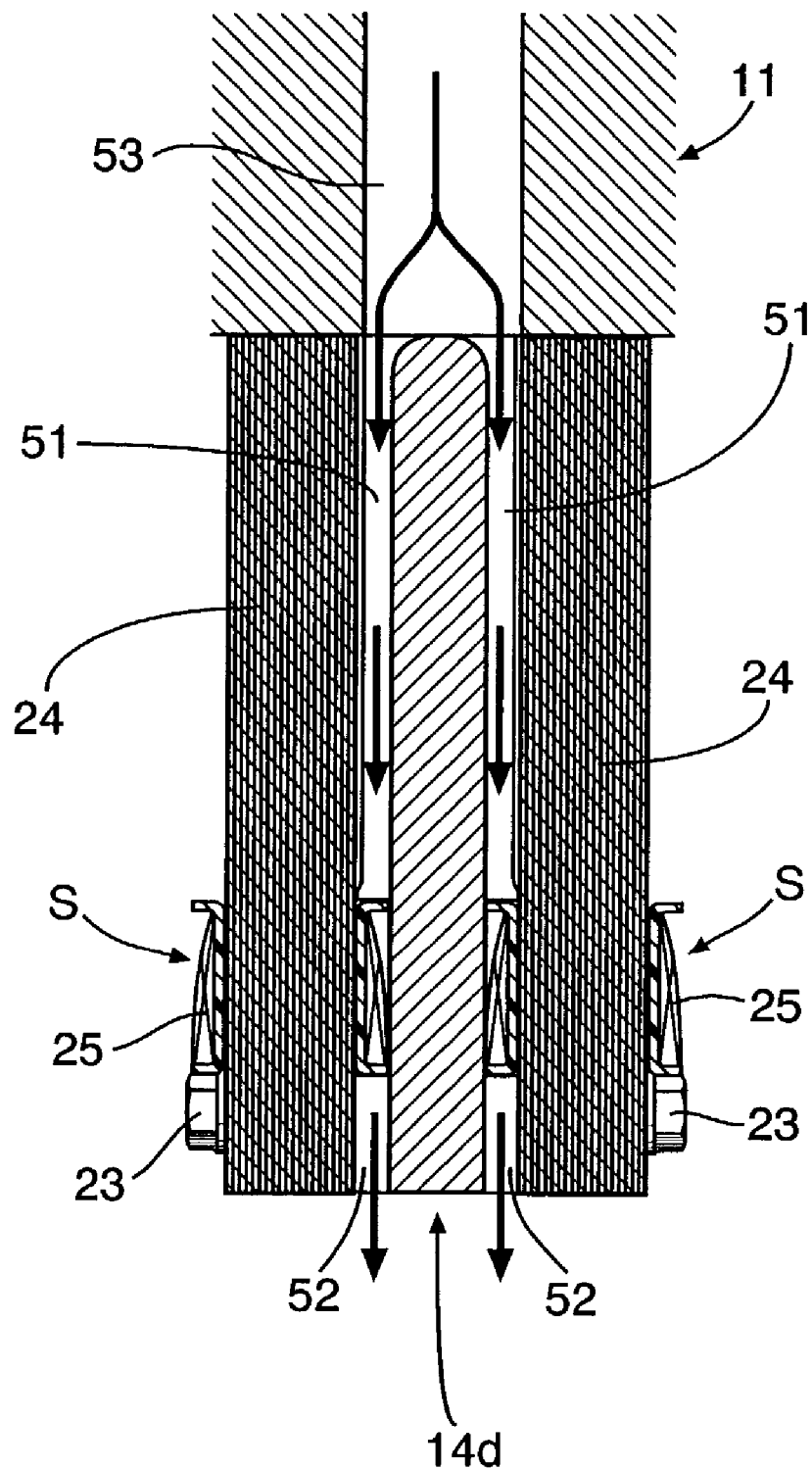

A second balancer shaft 42 (not shown) is accommodated in the balancer housing 44 to extend in a direction perpendicular to a sheet surface of FIG. 3. The second balancer shaft 42 has the same structure as the first balancer shaft 42, so that both the balancer shafts 42, 42 are rotated in opposite directions at a rotational speed twice that of the crankshaft 17 by transmitting the rotation of the first balancer shaft 42 through the two interlocking gears 43, 43 meshed with each other to the second balancer shaft 42, thereby reducing the secondary vibration of the internal combustion engine E.

The balancer device 41 of the above-described structure extends through below the first journal 18a, the second journal 18b and the third journal 18c to a location in front of the fourth journal 18d, and the two generator motors GM, GM are disposed adjacent opposite sides of the fourth journal 18d. In this way, the balancer device 41 is disposed below axially one end of the crankshaft 17, and the generator motors GM, GM are disposed at the axially other end of the crankshaft 17, so that the balancer device 41 and the generator motors GM, GM can be disposed compactly without interfering with each other.

The operation of the first embodiment of the present invention having the above-described arrangement will be described below.

When the internal combustion engine E is operated, the crankshaft 17 is rotated, and the primary vibration resulting from the reciprocal movements of the four pistons 27 is reduced by the action of the four balance weights 20 provided on the crankshaft 17. At this time, an effective vibration-preventing effect can be exhibited, while minimizing the weights of the balance weights 20, because the four balance weights 20 provided at the axially inner end of the first journal 18a, the axially inner end of the fifth journal 18e and the axially opposite ends of the third journal 18c are disposed equally in correspondence to the four pistons 27.

The two generator motors GM, GM are constituted by (1) the plurality of permanent magnets 22 fixed to the outer peripheries of the two disks 21 provided at some of the axial ends of the first to fifth journals 18a to 18e on which no balance weights 29 are provided, namely, at the axially opposite ends of the fourth journal 18d and (2) the coils 25 fixed to the opposite side faces of the bearing caps 14d. Therefore, the generator motors GM, GM can function as the motors by supplying electric current from an accumulating means (not shown) comprising a battery and a capacitor to the coils 25 during starting or acceleration of the vehicle, thereby assisting the power output of the internal combustion engine E. If the generator motors GM, GM functions as the motors at the start of the internal combustion engine E, the starting of the internal combustion engine E can be easily conducted, even if a special stator motor is removed.

On the other hand, if the generator motors GM, GM are allowed to function as the generators by rotating the crankshaft 17 by a driving force transmitted reversely from driven wheels during braking of the vehicle, a regenerative braking force can be generated in each of the generator motors GM, GM to alleviate the burden on a service brake. A kinetic energy for the vehicle can be recovered effectively as an electric energy by charging an electric power generated by the regenerative braking in the accumulating means, thereby reducing the fuel consumption of the internal combustion engine E.

A largest combustion load acts on the third journal 18c which is axially centrally located among the five journals 18a to 18e in the in-line 4-cylinder internal combustion engine E. However, because the generator motors GM, GM are disposed to adjoin the fourth journal 18d away from the third journal 18c, a load acting on the crankshaft 17 can be dispersed axially to reduce the required strength of the crankshaft 17, which contributes to a reduction in weight.

The rotor R of each generator motor GM has a structure in which the permanent magnets 22 are fixed to the outer periphery of the disk 21 over 360°, and, hence, any of the permanent magnets 22 is necessarily opposed to any of the coils 25 during rotation of the crankshaft 17. Thus, when the generator motor GM functions as the motor, an output torque can be continuously generated, and a variation in torque of the generator motor GM can be minimized. When the generator motor GM functions as the generator, electric power can be continuously generated.

In the generator motor GM, the coils 25 generate heat during operation of the generator motor GM to raise the temperature of the stator S, and, hence, the stator S is cooled by an oil in order to prevent the function as the motor and the function as the generator from being hindered. It cannot be realized that the stator S located above the surface of the oil stored in the oil pan 16 is cooled by the oil in the oil pan 16, and, hence, the stator S is cooled by the oil which has lubricated the valve-operating chamber in the cylinder head 12 and which is returning to the oil pan 16.

More specifically, the oil flowing down through the oil return passage 53 from the valve-operating chamber in the cylinder head 12 and a small amount of the oil flowing down through the blow-by gas passage 54 from the valve-operating chamber in the cylinder head 12 are supplied to the upper ends of the arcuate oil guide grooves 51, 51 defined in the opposite side faces of the bearing cap 14d, and then flow downwards therefrom to drop into the oil pan 16 through the opening 52. Because the coils 25 which are portions of the stator S are fitted in each of the oil guide grooves 51, the generator motor GM can be compactly disposed, while effectively utilizing a space in the oil guide groove 51. Also, the coils 25 can be cooled effectively by the flowing oil guided in the oil guide groove 51, whereby the temperature of the stator S can be lowered. In addition, the bearing cap 14d provided with the oil guide grooves 51, 51, through which the oil flows, are cooled, and, hence, the cores 24, 24 fixed to come into close contact with the side face of the bearing cap 14d are also cooled, thereby contributing to a decrease in temperature of the stator S.

In this manner, the oil returned from the valve-operating chamber in the cylinder head 12 to the oil pan 16 can be utilized effectively to cool the stator S of the generator motor GM, and particularly, the oil flowing vertically downwards along the oil guide grooves 51, 51 in the bearing cap 14d can be brought into contact with the coils 25 fitted in the oil guide grooves 51, 51, thereby enhancing the cooling effect for the stator S. A portion of the oil flowing through the oil passages 39 and 40 in the cylinder block 11 to lubricate the journal 18d of the crankshaft 17, flows downwards along the opposite side faces of the bearing cap 14d, and enters into the oil guide grooves 51, 51, thereby contributing to the cooling of the stator S of the generator motor GM.

Figure 6:
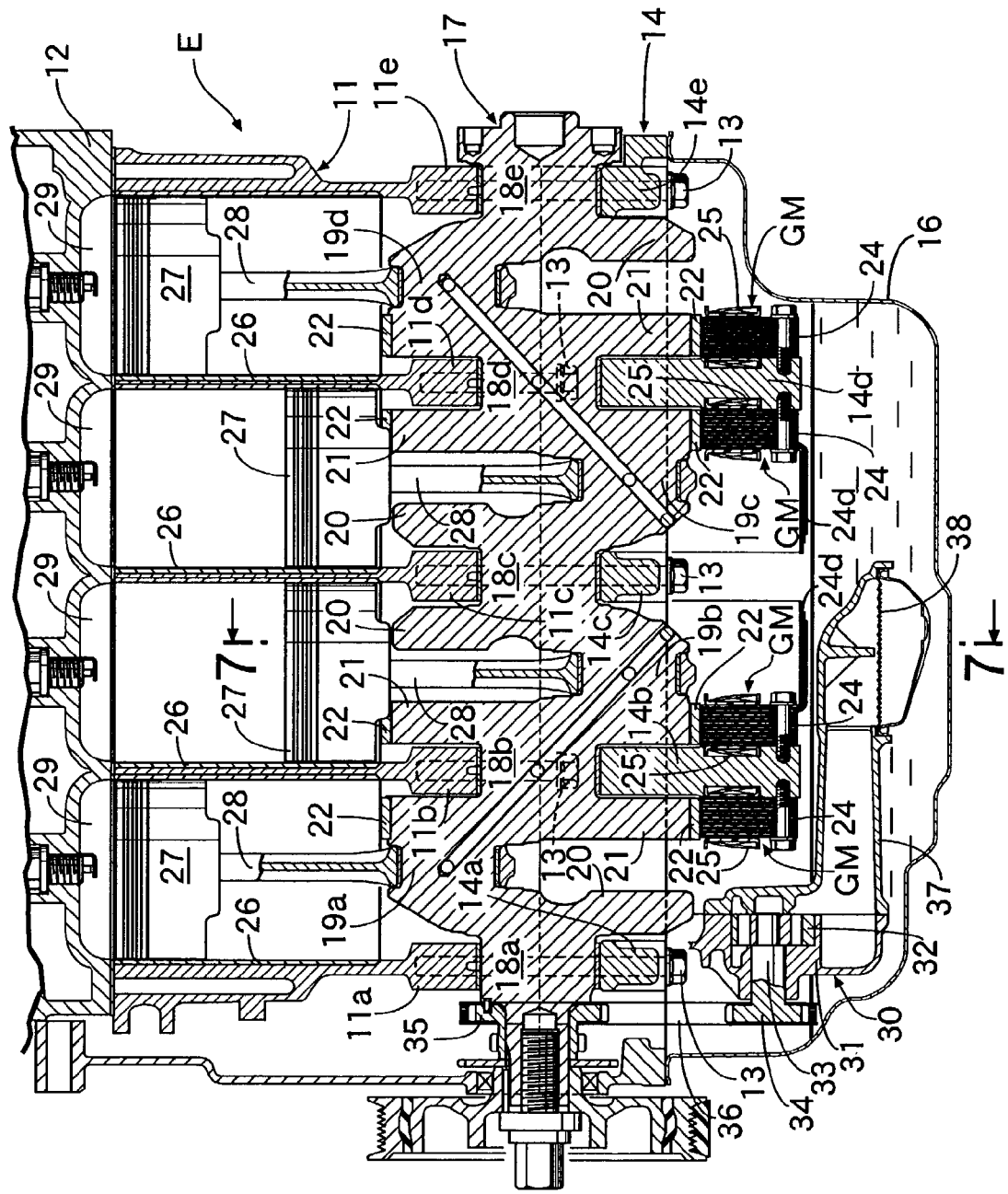
Figure 7:
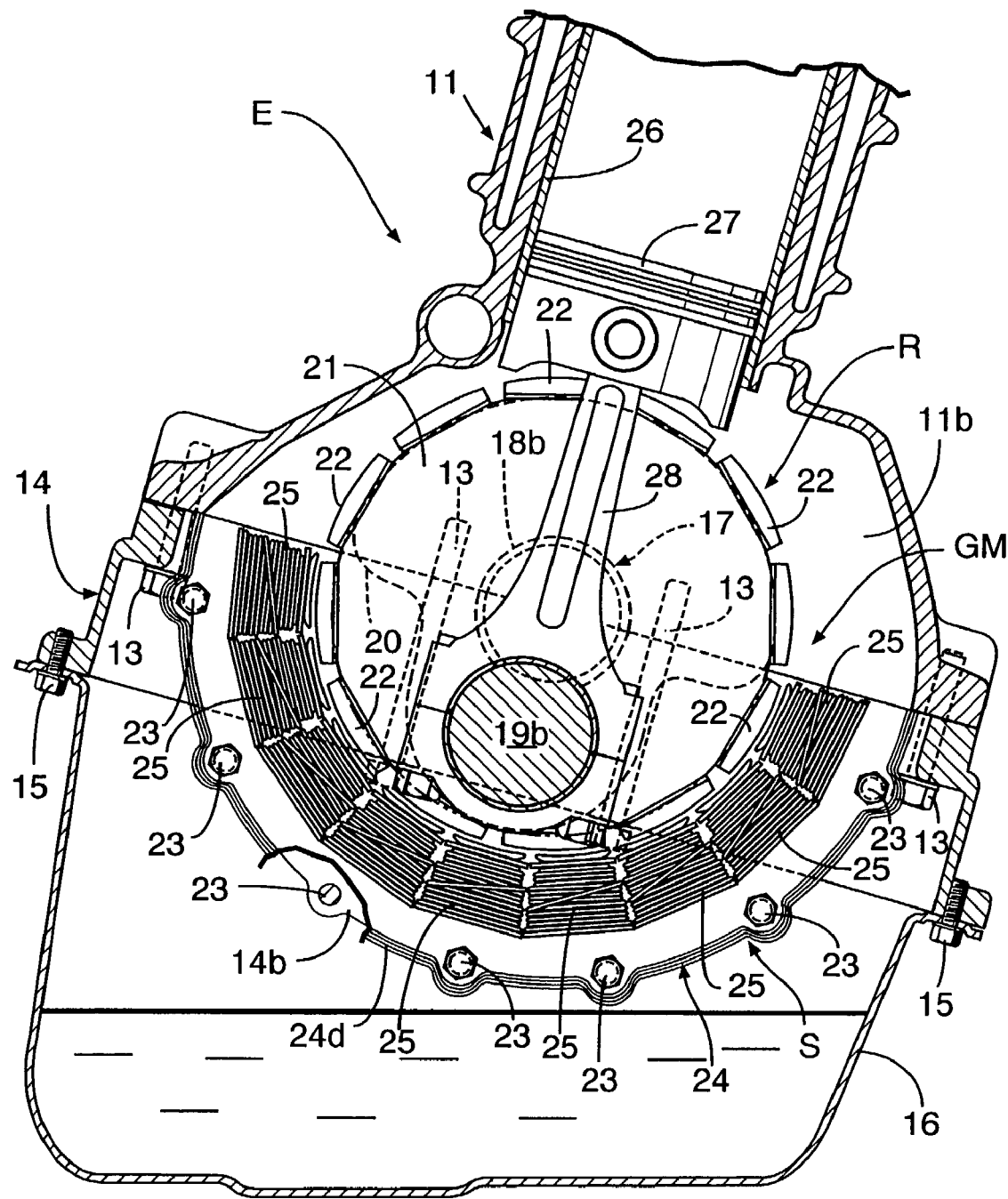
Figure 8:
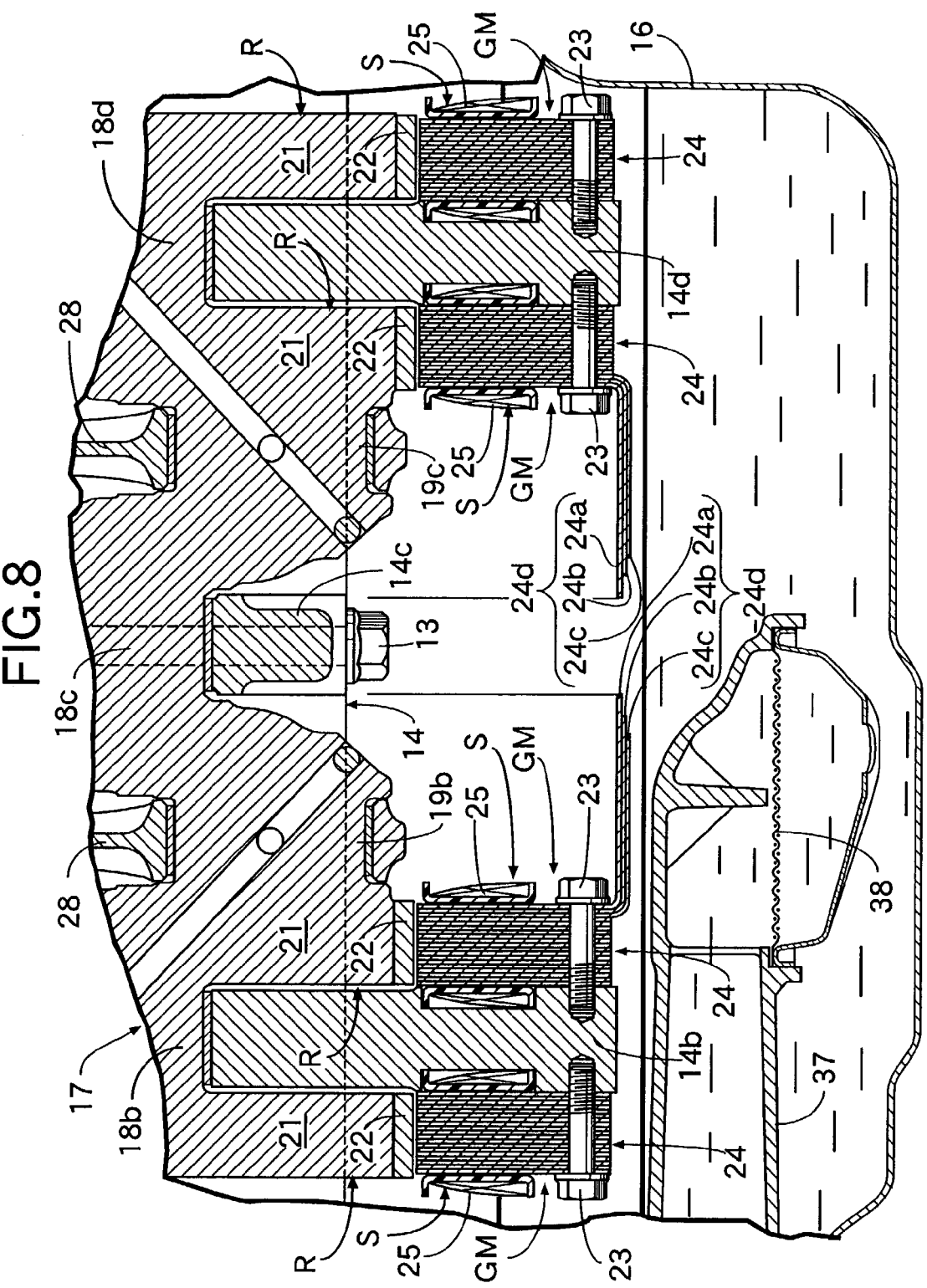

A second embodiment of the present invention will now be described with reference to FIGS. 6 to 8.

An in-line 4-cylinder internal combustion engine E according to the second embodiment is mounted in a hybrid vehicle, and includes four generator motors GM therein, each of which functions as a generator/motor. The internal combustion engine E includes a cylinder block 11, a cylinder head 12 coupled to an upper surface of the cylinder block 11 by a bolt (not shown), a crankcase 14 coupled to a lower surface of the cylinder block 11 by bolts 13, and an oil pan 16 coupled to a lower surface of the crankcase 14 by bolts 15.

The crankshaft 17 includes five journals 18a, 18b, 18c, 18d and 18e, and four crankpins 19a, 19b, 19c and 19d located between the journals 18a to 18e. A total of four balance weights 20 are integrally provided at an axially inner end of the first journal 18a, an axially inner end of the fifth journal 18e and axially opposite ends of the third journal 18c. The four balance weights 20 are formed into a fan shape around the first journal 18a, the third journal 18c and the fifth journal 18e serving as pivots (see FIG. 7). A total of four disks 21 are integrally provided at axially opposite ends of the second journal 18b and axially opposite ends of the fourth journal 18d. A plurality of (e.g., 12) permanent magnets 22 are mounted around an outer periphery of each of the four disks 21. The disk 21 and the permanent magnets 22 around the outer periphery of the disk 21 constitute a rotor R of the generator motor GM.

Five journal-supporting portions 11a, 11b, 11c, 11d and 11e are integrally provided on the cylinder block 11. The five journals 18a to 18e of the crankshaft 17 are rotatably supported between five bearing caps 14a, 14b, 14c and 14d integrally formed on the crankcase 14 and the five journal-supporting portions 11a to 11e, respectively. The two bearing caps 14b and 14d supporting the second journal 18b and the fourth journal 18d are larger than the other three bearing caps 14a, 14c and 14e, and each formed into a semicircular shape.

The stators S of the four generator motors GM are mounted on opposite side faces of the two bearing caps 14b and 14d each having a semi-circular shape. As can be seen from FIG. 7, the stator S of the generator motor GM mounted on the side of one 14b of the bearing caps 14b and 14d adjacent the crankpin 19c is comprised of a substantially arcuate core 24 which is formed of a large number steel plates superposed one on another and which is fixed to the bearing cap 14b by bolts 23, and a plurality of (e.g., 9) coils 25 wound around an inner periphery of the core 24. The outer peripheries of the plurality of permanent magnets 22 of the rotor R are opposed to inner peripheries of the plurality of coils 25 with small gaps left therebetween.

Axially inner two of the four generator motors GM are different in structure of the stators S thereof from the axially outer two generator motors GM. More specifically, among the large number of steel plates forming each of the cores 24, 24 of the axially inner two generator motors GM, GM, a plurality of (e.g., three) sets of steel plates 24a, 24b and 24c are bent axially inwards to come closer to each other, thereby constituting baffle plates also serving as heat-dissipating fins 24d.

Pistons 27 are slidably received in four cylinder bores 26 defined in the cylinder block 11, and the four pistons 27 and the four crankpins 19a to 19d are interconnected by connecting rods 28, respectively. Combustion chambers 29 are defined in a lower surface of the cylinder head 12, and face top faces of the pistons 27. The four pistons 27 are disposed so that when the first piston 27 between the first journal 18a and the second journal 18b and the fourth piston 27 between the fourth journal 18d and the fifth journal 18e are at top dead centers, the second piston 27 between the second journal 18b and the third journal 18c and the third piston 27 between the third journal 18c and the fourth journal 18d are at bottom dead centers.

An oil pump 30 accommodated in the oil pan 16 includes a pump housing 31, a pump rotor 32 accommodated in the pump housing 31, and a pump shaft 33 on which the pump rotor 32 is rotatably supported. A follower sprocket 34 mounted at an end of the pump shaft 33 protruding from the pump housing 31 is connected through an endless chain 36 to a drive sprocket 35 mounted at an end of the crankshaft 17. A strainer housing 37 extends along a bottom wall of the oil pan 16 to cover the pump rotor 32 by cooperation with the pump housing 31, and a strainer 38 is mounted at a tip end of the strainer housing 37.

Therefore, the rotation of the crankshaft 17 is transmitted through the drive sprocket 35, the endless chain 36 and the follower sprocket 34, to the pump shaft 33 to rotate the pump rotor 32 integral with the pump shaft 33. As a result, the oil stored in the oil pan 16 is drawn from the strainer 38 through the inside of the strainer housing 37 into the oil pump 30 and supplied therefrom to various portions of the internal combustion engine E.

The operation of the second embodiment having the above-described arrangement will be described below.

When the internal combustion engine E is operated, the crankshaft 17 is rotated, and the primary vibration resulting from the reciprocal movements of the four pistons 27 is reduced by the action of the four balance weights 20 provided on the crankshaft 17. At this time, an effective vibration-preventing effect can be exhibited, while minimizing the weights of the balance weights 20, because the four balance weights 20 provided at the axially inner end of the first journal 18a, the axially inner end of the fifth journal 18e and the axially opposite ends of the third journal 18c are disposed equally in correspondence to the four pistons 27.

The four generator motors GM are constituted by (1) the plurality of permanent magnets 22 fixed to the outer peripheries of the four disks 21 provided at some of the axial ends of the first to fifth journals 18a to 18e on which no balance weights 29 are provided, namely, at the axially opposite ends of the second journal 18b and the axially opposite ends of the fourth journal 18d and (2) the coils 25 fixed to the opposite side faces of the two bearing caps 14b and 14d. Therefore, the generator motors GM can function as motors by supplying electric current from an accumulating means (not shown) comprising a battery and a capacitor to the coils 25 during starting or acceleration of the vehicle, thereby assisting the power output of the internal combustion engine E. If the generator motors GM function as motors at the start of the internal combustion engine E, the starting of the internal combustion engine E can be easily conducted, even if a special stator motor is removed.

On the other hand, if the generator motors GM are allowed to function as the generators by rotating the crankshaft 17 by a driving force transmitted in reverse from driven wheels during braking of the vehicle, a regenerative braking force can be generated in each of the generator motors GM to alleviate the burden on a service brake. A kinetic energy for the vehicle can be recovered effectively as an electric energy by charging an electric power generated by the regenerative braking in the accumulating means, thereby reducing the fuel consumption of the internal combustion engine E.

A largest combustion load acts on the third journal 18c which is axially centrally located among the five journals 18a to 18e in the in-line 4-cylinder internal combustion engine E. However, because the generator motors GM are disposed to adjoin the second journal 18b and the fourth journal 18d away from the third journal 18c, a load acting on the crankshaft 17 can be dispersed axially to reduce the required strength of the crankshaft 17, which contributes to a reduction in weight.

The rotor R of each generator motor GM has a structure in which the permanent magnets 22 are fixed to the entire outer periphery of the disk 21 over 360°, and, hence, any of the permanent magnets 22 is necessarily opposed to any of the coils 25 during rotation of the crankshaft 17. Thus, when the generator motor GM functions as the motor, an output torque can be continuously generated, and a variation in torque of the generator motor GM can be minimized. When the generator motor GM functions as generator, electric power can be continuously generated.

In the generator motor GM, the coils 25 generate heat during operation of the generator motor GM to raise the temperature of the core 24, which may deteriorate the function as the motor and the function as the generator. However, the heat of the core 24 having the raised temperature can be dissipated, and the stator S can be effectively cooled, because among the large number of steel plates constituting the core 24, the predetermined number of steel plates 24a to 24c are bent to constitute the baffle plate 24d also serving as the heat-dissipating fin.

Because the baffle plate 24d also serving as the heat-dissipating fin is formed utilizing the steel plates 24a to 24c of the core 24, special parts are not required, leading to reductions in the number of parts and in the number of assembling steps. Moreover, because the plurality of (three in the embodiment) steel plates 24a to 24c are superposed one on another, the rigidity of the steel plates 24a to 24c can be ensured. Further, the baffle plate 24d also serving as the heat-dissipating fin is located in the vicinity of a surface of the oil stored in the oil pan 16, and, hence, the function of the baffle plate for preventing the shaking of the oil surface can be effectively performed.

Figure 9:
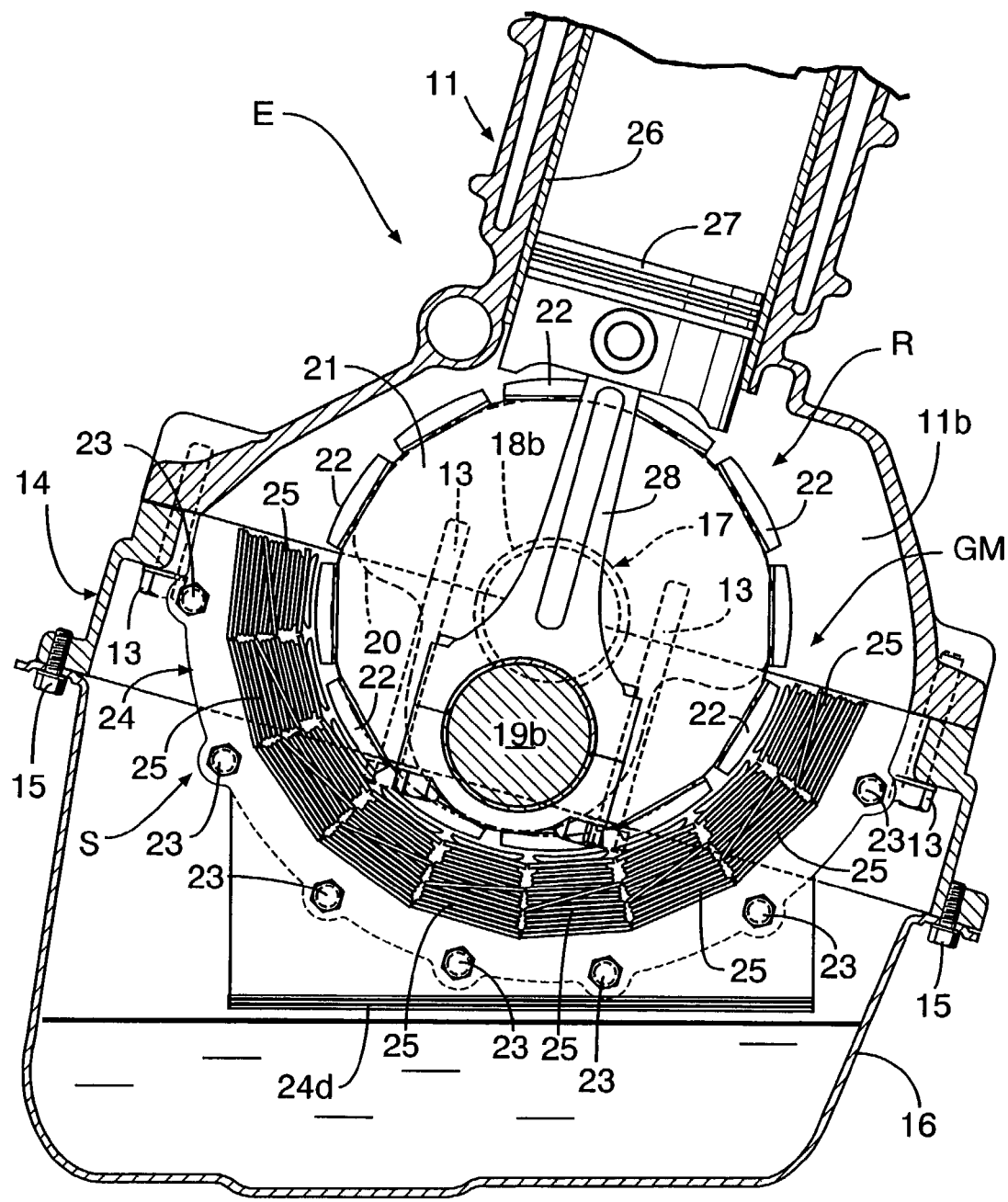
FIG. 9 is a view similar to FIG. 7, but showing a third embodiment of the present invention.

A third embodiment of the present invention will now be described with reference to FIG. 9.

The baffle plate 24d also serving as the heat-dissipating fin in the second embodiment is formed into the semi-circular shape along an outer periphery of a lower edge of each of the bearing caps 14b and 14d, but a baffle plate 24d also serving as a heat-dissipating fin in the third embodiment is formed into an L-shape in section and has a vertically extending portion and a horizontally extending portion. The third embodiment is similar to the second embodiment in that the baffle plate 24d also serving as the heat-dissipating fin is formed by bending three steel plates 24a to 24c of the large number of steel plates constituting the core 24.

The third embodiment also exerts a function and an effect similar to those in the second embodiment. Further, according to the third embodiment, the horizontally extending portion of the baffle plate 24d also serving as the heat-dissipating fin is bent rectilinearly with respect to the vertically extending portion, and hence it is easy to form the baffle plate 24d also serving as the heat-dissipating fin by working or processing, as compared with a case where the horizontally extending portion of the baffle plate 24d also serving as the heat-dissipating fin is bent into an arcuate shape. Also the horizontally extending portion is parallel to the surface of the oil in the oil pan, so that the function of the baffle plate can be enhanced.

Although the embodiments of the present invention have been described in detail, it will be understood that the present invention is not limited to the above-described embodiments, and various modifications in design may be made without departing from the spirit and scope of the invention defined in the claims.

For example, the internal combustion engine E according to the present invention is applicable to any use other than a traveling power source for the hybrid vehicle.

In addition, the generator GM may function only as the generator, and the generator GM may function only as the motor.

The stator S is cooled by the oil returned from the cylinder head 12 in each of the embodiments, but may be cooled by the oil stored in the oil pan 16.

In the internal combustion engine according to the sixth feature of the present invention, the baffle plate 24d also serving as the heat-dissipating plate may have no baffle plate function.

In the second and third embodiments, three steel plates 24a to 24c of the large number of steel plates constituting the core 24 of the stator S are extended to form the baffle plate 24d also serving as the heat-dissipating plate, but the number of the steel plates is not limited to three. Further, the baffle plate 24d also serving as the heat-dissipating plate may be formed by another member fixed to the core 24.

In each of the embodiments, the permanent magnets 22 are fixed to the outer periphery of the disk 21 of the crankshaft 17 to constitute the rotor R, but the permanent magnets 22 may be fixed to the outer periphery of the balance weight 20 to constitute the rotor R. Namely, the rotor R may be constituted utilizing any web of the crankshaft 17.

In addition, it is most effective that the permanent magnets 22 are mounted on an outer peripheral surface of the disk 21, but the permanent magnets 22 may be mounted on a sidewall of each of the disks 21, if the sidewall is included in the outer periphery of the dusk 21.

Further, the present invention is applicable to an internal combustion engine having any number of cylinders, except for the internal combustion engines according to the twelfth and thirteenth features of the present invention.

Furthermore, the twelfth and thirteenth features of the present invention are applicable to banks not only in an in-line 4-cylinder internal combustion engine, but also in a V-type 8-cylinder internal combustion engine and a horizontally opposed 8-cylinder internal combustion engine.

Yet further, the permanent magnets 22 are mounted on the total four disks 21 of the second journal 18b and the fourth journal 18d in each of the second and third embodiments, but the permanent magnets 22 may be mounted on any one of the disks 21. The permanent magnets 22 are mounted on the total two disks 21, 21 of the fourth journal 18d in the first embodiment, but the permanent magnets 22 may be mounted on any one of the disks 21.

What is claimed is:

1. An internal combustion engine including a generator or motor having a stator comprised of a core and coils mounted to the core is opposed to permanent magnets mounted at a moving portion of the internal combustion engine,
   wherein said internal combustion engine further includes a stator-cooling means for cooling said stator with oil emanating directly from an overhead passage for returning the oil within a cylinder head to an oil pan, wherein the oil passes through said stator prior to reaching said oil pan, and
   wherein the stator is located above a surface of the oil within the oil pan and just below the overhead passage.

2. The internal combustion engine as recited in claim 1, wherein cooling oil is supplied to an upper portion of said stator.

3. An internal combustion engine including a generator or motor whose stator comprised of a core and coils mounted to the core is opposed to permanent magnets mounted at a moving portion of the internal combustion engine,
   wherein said internal combustion engine further includes a stator-cooling means for cooling said stator with oil directly from a passage for returning the oil within a cylinder head to an oil pan, wherein the oil passes through said stator prior to reaching said oil pan,
   wherein the stator is located above a surface of the oil within the oil pan,
   wherein cooling oil is supplied to an upper portion of said stator, and
   wherein at least a portion of said stator is accommodated in an oil guide groove defined in a side face of a stator-supporting member, and the cooling oil is supplied to an upper potion of said oil guide groove.

4. An internal combustion engine including a generator or motor having a stator comprised of a core and coils mounted to the core is opposed to permanent magnets mounted at a moving portion of the internal combustion engine,
   wherein said internal combustion engine further includes a stator-cooling means for cooling said stator with oil,
   wherein said stator having the coils wound around the core formed by laminated steel plates is fixed to a bearing cap which rotatably supports a crankshaft by cooperation with a cylinder block,
   wherein said generator or motor, whose rotor having a plurality of permanent magnets fixed to an outer periphery of a web of the crankshaft is opposed to an inner periphery of said stator, is disposed in an upper space in an oil pan disposed below said cylinder block,
   wherein said core of said stator is provided with a heat-dissipating fin,
   wherein the stator is located above a surface of the oil within the oil pan,
   wherein said heat-dissipating fin provided on the core of said stator constitutes a baffle plate for the oil pan, and
   wherein said heat-dissipating fin is formed to have a portion extending parallel to the surface of the oil within the oil pan.

5. An internal combustion engine according to claim 4 wherein said heat-dissipating fin is formed by extending some of the steel plates constituting the core of said stator.

6. An internal combustion engine according to claim 4 wherein said heat-dissipating fin is formed by superposing a plurality of the steel plates on one another.

7. An internal combustion engine including a generator or motor whose stator comprised of a core and coils mounted to the core is opposed to permanent magnets mounted at a moving portion of the internal combustion engine, wherein said internal combustion engine further includes a stator-cooling means for cooling said stator with oil, wherein said generator or motor comprises a plurality of coils mounted on a bearing cap rotatably supporting the crankshaft by cooperation with a cylinder block, and a plurality of permanent magnets mounted on the crankshaft, wherein at least one balance weight and at least one disk are mounted at ends of a plurality of journals of the crankshaft, and wherein the permanent magnets are mounted on an outer peripheral portion of the disk, so that they are opposed to the coils for movement relative to the coils.

8. An internal combustion engine according to claim 7 wherein said permanent magnets are mounted on the entire outer peripheral portion of said at least one disk.

9. An internal combustion engine according to claim 7 wherein said crankshaft includes first to fifth journals, wherein a total of four of said balance weights are mounted at one end of the first journal, one end of the fifth journal and opposite ends of the third journal, and wherein the disk is mounted on at least one of opposite ends of the second journal and opposite ends of the fourth journal.

10. An internal combustion engine according to claim 9, wherein a total of four disks are mounted at the opposite ends of the second journal and the opposite ends of the fourth journal.

11. An internal combustion engine according to claim 7 wherein a balancer device is mounted below axially one end of the crankshaft, and wherein said generator or motor is mounted at the axially other end of the crankshaft in a manner such that it does not interfere with said balancer device.

12. An internal combustion engine including a generator or motor whose stator comprised of a core and coils mounted to the core is opposed to permanent magnets mounted at a moving portion of the internal combustion engine, wherein cooling oil is supplied to an upper portion of said stator, wherein said stator having the coils wound around the core formed by laminated steel plates is fixed to a bearing cap which rotatably supports a crankshaft by cooperation with a cylinder block, wherein said generator or motor whose rotor having a plurality of permanent magnets fixed to an outer periphery of a web of the crankshaft is opposed to an inner periphery of said stator, is disposed in an upper space in an oil pan disposed below said cylinder block, and wherein said core of said stator is provided with a heat-dissipating fin.

13. An internal combustion engine according to claim 12, wherein said heat-dissipating fin provided on the core of said stator constitutes a baffle plate for the oil pan.

14. An internal combustion engine including a generator or motor whose stator comprised of a core and coils mounted to the core is opposed to permanent magnets mounted at a moving portion of the internal combustion engine, wherein cooling oil is supplied to an upper portion of said stator, wherein said generator or motor comprises a plurality of coils mounted on a bearing cap rotatably supporting the crankshaft by cooperation with a cylinder block, and a plurality of permanent magnets mounted on the crankshaft, wherein at least one balance weight and at least one disk are mounted at ends of a plurality of journals of the crankshaft, and wherein the permanent magnets are mounted on an outer peripheral portion of the disk, so that they are opposed to the coils for movement relative to the coils.

\* \* \* \* \*